United States Patent [19]

Taubenmann

[11] 4,379,122

[45] Apr. 5, 1983

[54] MIXING HEAD FOR REACTIVE COMPONENTS

[75] Inventor: Peter Taubenmann, Munich, Fed. Rep. of Germany

[73] Assignee: Krauss-Maffei Aktiengesellschaft, Munich, Fed. Rep. of Germany

[21] Appl. No.: 229,945

[22] Filed: Jan. 30, 1981

[30] Foreign Application Priority Data

Feb. 13, 1980 [DE] Fed. Rep. of Germany ....... 3005231

[51] Int. Cl.³ .......................... B01F 5/04; B01F 15/02; B01F 17/00; B01J 13/00
[52] U.S. Cl. ................................ 422/133; 137/625.4; 251/57; 366/137; 366/159; 422/234
[58] Field of Search ................. 422/131–135; 251/57; 137/625.4; 366/137 X, 150, 159, 170

[56] References Cited

U.S. PATENT DOCUMENTS

| | | | |
|---|---|---|---|
| 3,799,199 | 3/1974 | Rumpft | 137/625.4 |
| 4,013,391 | 3/1977 | Boden et al. | 366/159 |
| 4,089,172 | 3/1978 | Junttila | 251/57 |
| 4,252,446 | 2/1981 | Bauer | 366/177 |

FOREIGN PATENT DOCUMENTS 2612812 4/1977 Fed. Rep. of Germany .

Primary Examiner—Michael S. Marcus
Attorney, Agent, or Firm—Karl F. Ross; Herbert Dubno

[57] ABSTRACT

A mixing head for mutually reactive components, e.g. of a synthetic resin to be injected into a mold cavity, comprisess a control member which is shiftable in a mixing chamber opening into the mold cavity between a position in which mixing of the components can occur in this chamber and a position in which the member expels the mixture from the chamber and provides recirculating passages for the two components. A displacement body can be inserted into the chamber to control the mixing action by a fluid-operated actuator hydraulically coupled to a fluid displacement member shifted by the control member.

6 Claims, 4 Drawing Figures

MIXING HEAD FOR REACTIVE COMPONENTS

FIELD OF THE INVENTION

My present invention relates to a mixing head for reactive components, especially synthetic resin components, provided with a displacement body which can be inserted in the mixing chamber to control the mixing action. More particularly, the invention deals with improvements in mixing heads of the type in which two reactive components are fed to a mixing chamber having a control member, piston or ram which can be shifted to displace the mixture out of the chamber and retracted to permit the mixing action.

BACKGROUND OF THE INVENTION

It is known in the molding of synthetic resin materials from two reactive components, e.g. isocyanates and polyols in the production of polyurethanes or epoxide resins and amine hardeners in the production of epoxies, to utilize a mixing head connected to a mold cavity and having a cylindrical mixing chamber in which a control member, plunger, piston or ram is axially displaceable.

In one position of this control member, the end thereof is flush with the end of the mixing chamber and passages formed in the control member allow continuous recirculation of the two components from and to a supply vessel, e.g. via respective pumps, thereby preventing the development of static conditions which may result in blocking the inflow of the two reactive components.

In a second position, wherein the end of the control member is retracted from the end of the mixing chamber, inlets for the two components are unblocked and the two components are permitted to enter the mixing chamber for intimate mixing in the latter and discharge into the mold cavity.

Upon displacement of the control member from the second position into the first, residues of the mixture are forced out of the mixing chamber into the mold cavity and the aforementioned recirculation paths are reestablished.

Reference may be had to the following U.S. patents and the literature and art cited therein for a fuller description of such mixing heads: U.S. Pat. No. 3,706,515, U.S. Pat. No. 4,167,236, and U.S. Pat. No. 4,211,345.

It is also known, in connection with such mixing heads, to introduce into the mixing chamber a displacement or constricting body which, while occupying only a portion of the volume of the mixing chamber when the control member is retracted, serves to increase the pressure ahead of the inlets and mechanically obstruct partially the discharge of the mixture into the mold cavity. Reference may be had to German Pat. No. 20 65 841 in this connection.

The use of this displacement body markedly improves the intimacy of the mixing quality of the molded article.

Obviously, the operation of the displacement body, its insertion into the mixing chamber, must coincide with the shifting of the control member into its second or retracted position to prevent interference between this member and the displacement body. The displacement body is generally hydraulically actuated and in prior systems the control of its hydraulic displacement has been effected by a control signal generated by the movement of the control member.

In German patent document—Printed Application DE-AS No. 25 44 749, this control utilizes a position sensor responding to the position of the control member.

In German patent document—Open Application DE-OS No. 24 13 337, the control system for the hydraulic actuation of the control member is utilized to operate the displacement body as well via a separate but complex hydraulic network.

German patent document—Open Application—DE-OS No. 26 12 812 provides an electrohydraulic control for the displacement body which is triggered by a limit switch actuated by retraction of the control member.

In all of the aforementioned cases, the systems for operating the displacement body utilizes expensive and frequently unreliable components and may be sensitive to failure, e.g. of an electric current supply network or the like.

OBJECTS OF THE INVENTION

It is, therefore, the principal object of the present invention to provide an improved system for operating the displacement body in a mixing head of the aforedescribed type.

Another object of this invention is to provide an improved mixing head with simplified synchronization of the movements of the control member and the displacement body.

SUMMARY OF THE INVENTION

These objects and others which will become apparent hereinafter are attained, in accordance with the present invention, by providing the control member with a first piston-and-cylinder arrangement such that fluid is displaced upon movement of the control member into its retracted or second position, the displacement body being provided with a second piston-and-cylinder arrangement connected to this chamber of the first arrangement so that the second piston will displace the body into the mixing chamber with the fluid displaced from the chamber.

Thus two interconnected hydraulic cylinders are provided, the interconnection being a duct, so that retraction of the control member hydraulically displaces the displacement body into its operative position.

According to a feature of the invention, this duct is connected to a pressure accumulator or hydraulic or pneumatic buffer.

It has also been found to be advantageous to provide each of the piston-and-cylinder arrangements with a spring adapted to displace the respective piston in an opposite direction from that described.

Accordingly, the spring of the first arrangement is effective to resist the movement of the control member into its retracted position, i.e. biases the control member with its first position corresponding to recirculation of individual components.

The spring of the second hydraulic arrangement is effective to withdraw the displacement body from the mixing chamber.

With the system of the present invention, the displacement body is hydraulically controlled, albeit with a separate closed system independent from the hydraulic system operating the control member and filled with a liquid preferably oil. The cost of this system and its maintenance is minimal and the hydraulic synchronization is reliable.

The use of the accumulator or fluid buffer permits the two cylinders to be of different sizes and/or the pistons thereof to have different strokes or displacements which is a convenient construction.

The spring loading of the hydraulic cylinder arrangements permits the use of a single duct to interconnect the two cylinder arrangements.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
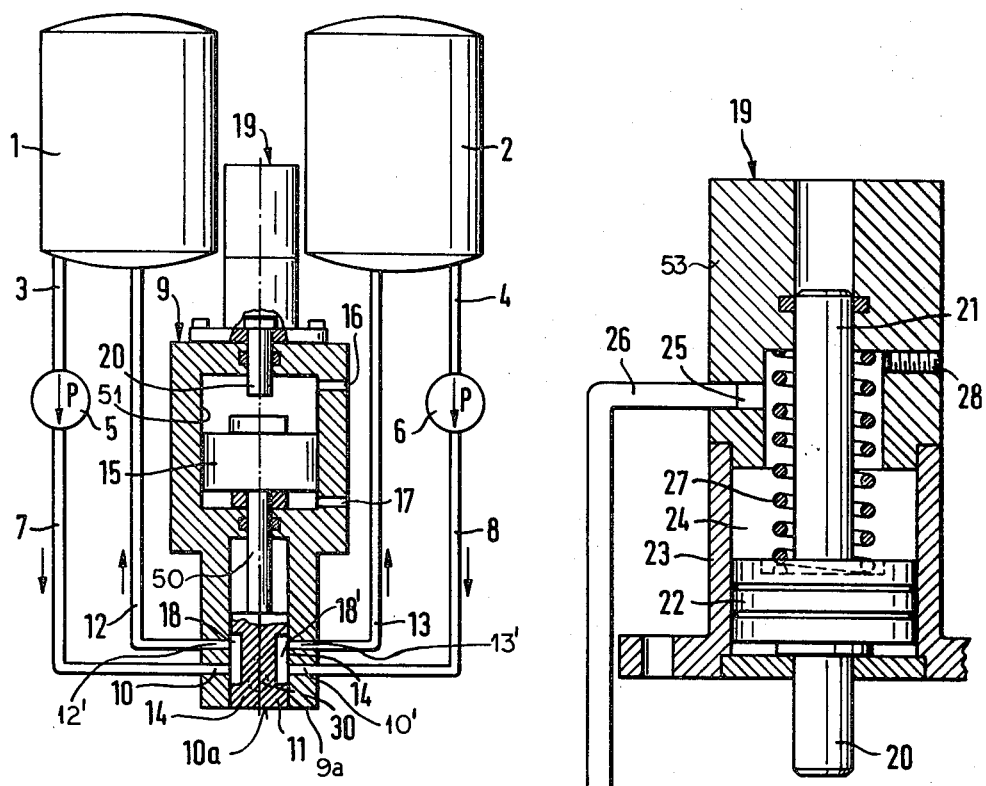
FIG. 1 is a schematic cross-sectional view through a mixing head embodying the invention.

In FIG. 1 I have shown two reservoirs 1 and 2 for two reactive synthetic resin components, e.g. an isocyanate component and a polyol component, adapted to react upon mixing to form, for example, a polyurethane.

Figure 1A:
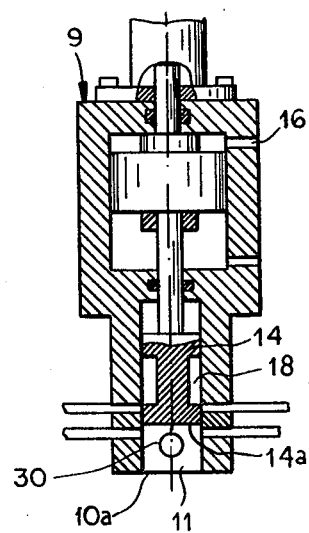
FIG. 1A shows the control member thereof in its retracted position, also in section.

Each of these components if drawn by a pipe 3 or 4 and a respective pump 5 or 6 from the supply vessel 1 or 2 and fed via a feedline to a respective inlet 10, 10' opening diametrically opposite one another into a mixing chamber 11 when a control member 14 is retracted (FIG. 1A). The mixing chamber 11 is formed as the lower portion of a cylindrical bore which has an outlet 10a opening into a mold cavity (not shown) in the housing 9 of the mixing head, this cylindrical bore slidably receiving the control member which is formed as a ram, plunger or piston adapted to drive mixture residues of the reactive components from chamber 11.

In the first position shown in FIG. 1, the end 14a of the control element 14 lies flush with the underside 9a of the housing 9 and, generally, with a wall of the mold cavity.

The control member 14 is provided with a pair of passages 18 and 18' which connect the inlets 10,10' with outlets 12', 13' connected respectively to return pipes 12 whereby the respective liquid components are recycled to the vessels 1 and 2 in the first position of the control member 14.

The control member 14 is connected by a piston rod 50 with a piston 15 displaceable in a cylinder 51 which is of the double-acting type and is supplied via ports 16 and 17 with a hydraulic medium to control the position of element 14.

Control systems for this purpose are described in the aforementioned patents.

When the cylinder 51 is pressurized through port 16, piston 15 is displaced downwardly to drive member 14 into the position shown in FIG. 1 in which recyling of the reactive components is permitted and residues are driven out of the chamber 11. When the chamber 51 is pressurized through port 17, however, the piston 15 upwardly, thereby retracting member 14 into the position shown in FIG. 1A, unblocking the inlets 10 and 10' and permitting mixing of the components in chamber 11 and discharge of the mixture into the mold cavity.

Figure 2:
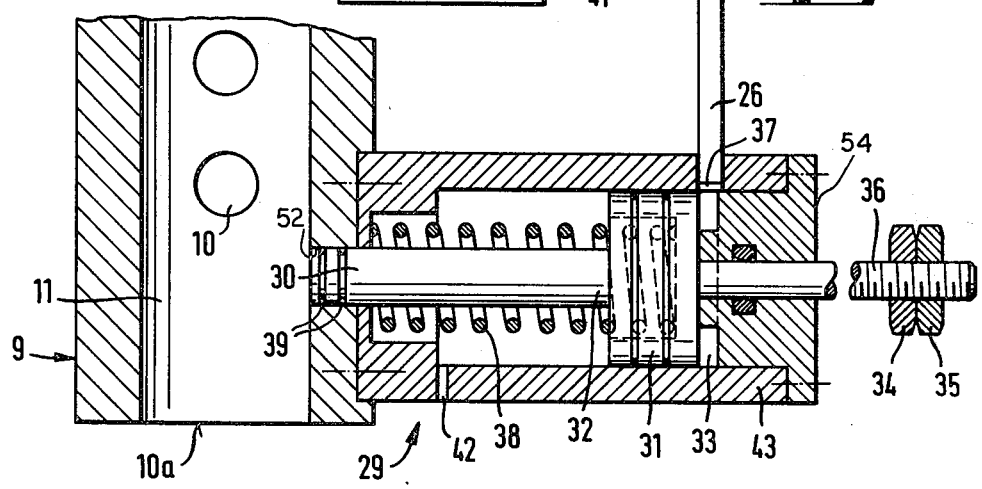
FIG. 2 is a diagrammatic section illustrating the actuation of the displacement body in accordance with the present invention and shown to a larger scale.

The mixing chamber 11 is provided with a further lateral bore 52 through which a displacement body in the form of circular cross-section rod 30 can be inserted laterally into the mixing chamber by a cylinder arrangement 29 which is not visible in FIGS. 1 and 1A but can be seen in FIG. 2.

This cylinder arrangement is controlled by a cylinder arrangement 19 mounted on the mixing head 9 and having a pin 20 projecting into the chamber 51 and engageable by the upper end of the piston 15 as shown in FIG. 1A so that, in the upper position of piston 15, the pin 20 is pressed upwardly.

From FIG. 2 it will be apparent that the pin 20 is connected to a piston 22 fixed to a piston rod 21 guided in the body 53 of the cylinder arrangement 19. The cylinder chamber 24 of this piston 22 is formed by a housing 23 connected to the body 53 and communicates via a pipe 26 with the cylinder arrangement 29 for actuating the displacement body 30.

The piston 22 is biased by a compression-type coil spring 27 downwardly, i.e. opposite to the upward displacement which actuates the body 30, while a screw plug 28 is provided at the upper end of the chamber 24 to allow venting of air from the system. This ensures that the entire actuating system can be filled by an incompressible fluid, namely, the hydraulic medium.

The port 25 connects duct 26 to the cylinder 24.

Thus when the piston 22 is displaced upwardly by the piston 15, hydraulic fluid is driven from the chamber 24 through the pipe 26. The plug 28 can also be removed for filling of the system with the hydraulic fluid.

The pipe 26 opens, at its opposite ends, at a port 37 of the cylinder arrangement 29 which comprises a housing 43 connected to the head 9 and in which the body 30 is guided. The body so is here formed as the piston rod of a piston 31, the piston rod being generally designated at 32 and being surrounded by a coil spring 38 urging the piston 31 into the position shown. When the hydraulic fluid is displaced by the piston 32 to the pipe 26 into the chamber 33 behind the piston 31, the latter is displaced to the left, i.e. into the mixing chamber 11 below the inlets 10, 10' but above the outlet 10a.

The position or depth of penetration of body 30 into the mixing chamber is determined by an adjusting nut 34 threaded onto a spindle 36 carried by the piston and adapted to engage the surface 44 of the housing 43.

A counternut 35 locks the nut 34 in place.

The displacement body functions to improve the intimacy of mixing in the manner already described and known in the art.

When the piston 15 moves downwardly to shift the member 14 from its second position (FIG. 1A) into its first position (FIG. 1), spring 27 displaces piston 22 downwardly and the hydraulic fluid passes via line 26 into chamber 24 permitting the spring 38 to move the piston 31 to the right and withdraw the body 30 from the mixing chamber. The control member 14 and the body 30 are thus fully synchronized.

A bore 42 in the housing 43 drains fluid leaking past the piston 31. The forward end of the body 30 has two circumferential grooves 39 which facilitate sealing in the wall of the head 9 since they fill with mixture which sets to form synthetic resin sealing rings therein. As these rings wear they are renewed by fresh synthetic resin from the mixing chamber.

A branch line 41 connects a conventional pressure accumulator 40 to the line 46 so that the displacement of the pistons 22 and 31 need not correspond precisely, the accumulator acting as a buffer to receive excess fluid.

I claim:

1. A mixing head for two reactive components comprising:
   housing means forming a mixing chamber and having respective inlets supplied with said components and adapted to open into a mold cavity;
   a control member displaceable in said housing means between a first position wherein flow from said inlets into said chamber is blocked and residual mixtures of said components are displaced from said chamber, and a second position wherein flow from said inlets into said chamber is unblocked, said control member defining passages for recirculating said compartments from said inlets in said first position of said control member;
   a first cylinder arrangement including a piston operatively connected to said control member and hydraulically actuatable to shift said control member between said positions;
   a displacement body laterally shiftable into and out of said chamber for controlling the mixing of said components thereof;
   a second cylinder arrangement having a piston connected to said body and hydraulically operable to shift said body into said chamber;
   a third cylinder arrangement mounted on said housing means and having a piston positioned for mechanical displacement by the piston of said first cylinder upon movement of said member from said first position to said second position to displace hydraulic fluid from said third cylinder arrangement; and
   a duct connecting said second and third cylinder arrangements whereby the movement of the piston of said third cylinder arrangement induces movement of the piston of said second cylinder arrangement, and independent of the hydraulic operation of said first cylinder arrangement, for establishing hydraulic fluid communication therebetween for shifting said body into said chamber upon movement of said member from said first position to said second position and for withdrawing said body from said chamber upon movement of said member from said second position toward said first position.

2. The mixing head defined in claim 1, further comprising a hydraulic pressure accumulator connected to said duct.

3. The mixing head defined in claim 1 wherein the piston of said third cylinder arrangement is shiftable in a first direction upon movement of said member into said second position, said third cylinder arrangement including a spring acting upon the piston thereof to urge the same in a direction opposite said first direction.

4. The mixing head defined in claim 1 wherein said second cylinder arrangement comprises a spring urging the piston thereof in a direction tending to withdraw said body from said chamber, said duct forming a single hydraulic path between chambers of said second and third cylinder arrangements.

5. The mixing head defined in claim 1 wherein said piston of said third cylinder arrangement has a stem extending into said first cylinder arrangement and engageable by the piston thereof.

6. The mixing head defined in claim 5 wherein said body is formed with grooves adapted to be filled by said mixture.

* * * * *